(12) United States Patent
Hsu et al.

(10) Patent No.: US 8,887,593 B2
(45) Date of Patent: Nov. 18, 2014

(54) DEVICE OF A PAIR OF CLAW-TYPE ROTORS HAVING SAME PROFILES

(71) Applicant: Liung Feng Industrial Co., Ltd., New Taipei (TW)

(72) Inventors: Tsang Lin Hsu, New Taipei (TW); Tien-Tung Chung, New Taipei (TW)

(73) Assignee: Liung Feng Industrial Co., Ltd., New Taipei City (TW)

( * ) Notice: Subject to any disclaimer, the term of this patent is extended or adjusted under 35 U.S.C. 154(b) by 92 days.

(21) Appl. No.: 13/798,084

(22) Filed: Mar. 13, 2013

(65) Prior Publication Data
US 2014/0102233 A1    Apr. 17, 2014

(30) Foreign Application Priority Data

Oct. 15, 2012 (TW) ............... 101137981 A

(51) Int. Cl.
| | |
|---|---|
| *F01C 1/18* | (2006.01) |
| *F16H 55/17* | (2006.01) |
| *F01C 1/08* | (2006.01) |
| *F16H 55/08* | (2006.01) |
| *F01C 1/12* | (2006.01) |

(52) U.S. Cl.
CPC ............... *F16H 55/08* (2013.01); *F01C 1/084* (2013.01); *F01C 1/123* (2013.01)
USPC ............................ 74/434; 418/205

(58) Field of Classification Search
USPC ........ 74/412 R, 431, 432, 434, 457; 418/191, 418/199, 200, 205
See application file for complete search history.

(56) References Cited

U.S. PATENT DOCUMENTS

| | | | | |
|---|---|---|---|---|
| 1,426,820 | A | | 8/1922 | Crawford |
| 3,620,655 | A | * | 11/1971 | Arnegard ...................... 418/151 |
| 4,224,016 | A | | 9/1980 | Brown |
| 4,324,538 | A | | 4/1982 | Brown |
| 4,406,601 | A | | 9/1983 | Towner |
| 4,430,050 | A | | 2/1984 | Blazejewski |
| 4,508,496 | A | * | 4/1985 | Bowman ................... 418/201.3 |
| 4,765,195 | A | * | 8/1988 | Takami ........................... 74/113 |
| 5,149,256 | A | | 9/1992 | Schmitz |
| 5,209,134 | A | * | 5/1993 | Nguyen et al. .................. 74/437 |
| 6,364,642 | B1 | * | 4/2002 | Garczorz et al. ................ 418/15 |
| 6,776,594 | B1 | * | 8/2004 | Heng-I et al. .............. 418/206.5 |
| 2014/0174231 | A1 | * | 6/2014 | Beirinckx et al. .......... 74/412 R |

* cited by examiner

*Primary Examiner* — Justin Krause
(74) *Attorney, Agent, or Firm* — Cheng-Ju Chiang

(57) ABSTRACT

The present invention is to provide a device of a pair of claw-type rotors having same profiles, the device includes a defined rotor and a conjugate rotor intermeshing with and conjugating to each other. The defined rotor includes a first claw having a cross-section profile having an epicycloid, a first arc, a second arc, a third arc, and a fourth arc all connected together in sequence in a counterclockwise direction. The first, second, third, and fourth arcs are connected with slope continuity, whereby locations of centers, values of radiuses and arc angles of the second and third arcs are capable of being defined in accordance with the slope continuity and geometric relations between the first and fourth arcs. The conjugate rotor has a first claw having a cross-section profile generated by utilizing a conjugate curve corresponding to the first claw of the defined rotor.

9 Claims, 6 Drawing Sheets

DEVICE OF A PAIR OF CLAW-TYPE ROTORS HAVING SAME PROFILES

BACKGROUND OF THE INVENTION

1. Field of the Invention

The present invention relates to a claw-type rotor device, and more particular to a device of a pair of claw-type rotors having same profiles that enables a smooth process of intermeshing of the rotors without producing noise and mechanical fatigue, and provides an even number of claws for each rotor by setting suitable parameters.

2. Related Art

Conventional claw-type rotors are varied in structure according to practical applications. Each of rotors operating in pairs may have either an odd number of claws or an even number of claws. Whatever types of claw-type rotors are, conventional claw-type rotors operating in pairs generally have a conjugate rotor and a defined rotor both intermeshing and engaging with each other with claws thereof for providing compressing motion in periodic cycles. Relevant claw-type rotors are disclosed in U.S. Pat. Nos. 1,426,820, 5,149,256, 4,406,601, 4,324,538, 4,224,016, 4,430,050.

However, conventional claw-type rotors have drawbacks that noise and vibration occur during the process of intermeshing and engaging of the rotors. It is because sharp-portion curves of two claws are not smoothly and continuously formed, whereby causing the defined rotor and the conjugate rotor to intermesh incompletely. Noise and vibration then arise during the process of compressing motion, and even worse such incompletely intermeshing may wear out the rotors and shorten the lifespan thereof.

SUMMARY OF THE INVENTION

Accordingly, an object of the present invention is to provide a device of a pair of claw-type rotors having same profiles, the device comprises a defined rotor and a conjugate rotor intermeshing with and conjugating to each other. Both the defined and conjugate rotors have same even number of claws of same profiles by setting parameters, and rotate in a continuously and smoothly motion curve, so as to avoid noise and vibration during the compressing motion in periodic cycles and to mitigate mechanical fatigue resulting from intermeshing of the defined and conjugate rotors, whereby extending the lifespan of the device of the claw-type rotors.

In accordance with a preferable embodiment of the present invention for achieving the above object, the defined rotor comprises a first claw having a cross-section profile consisting of an epicycloid, a first arc, a second arc, a third arc, and a fourth arc all connected together in sequence in a counterclockwise direction from the epicycloid to the first, second, third, and fourth arcs, wherein the first, second, third, and fourth arcs jointly form an angle of 360° divided by the number of claws with respect to a center of the defined rotor, the first arc and the fourth arc each having a center being designated as same as the center of the defined rotor, and each of the first and fourth arcs having a same arc angle, the first arc having a radius same as the rotor radius of the defined rotor, the fourth arc having a radius which is the rotor radius subtracted from two times the pitch circle radius, wherein the first, second, third, and fourth arcs have slope continuity at points where they connect with each other, whereby locations of centers, values of radiuses and arc angles of the second and third arcs are capable of being defined in accordance with the slope continuity and geometric relations between the first and fourth arcs. Furthermore, the epicycloid of the first claw of the defined rotor is defined by a start point and an end point, the start point spaced away from the center of the defined rotor at a distance of the rotor radius subtracted from two times the pitch circle radius, while the end point is located outside the rotor radius.

According to the embodiment, the conjugate rotor comprises a first claw having a cross-section profile consisting of a first curve, a second curve, a third curve, a fourth curve, and an epicycloid all connected together in sequence in a clockwise direction from the first, second, third, and fourth curves to the epicycloid, wherein the first, second, third, and fourth curves are defined as a conjugate curve corresponding to the first, second, third, and fourth arcs of the defined rotor, and jointly form an angle of 360° divided by the number of claws with respect to a center of the conjugate rotor, the epicycloid of the conjugate rotor being formed by imaging the epicycloid of the first claw of the defined rotor and rotating around a center of the conjugate rotor to be located in place.

According to the embodiment, the defined rotor comprising a second claw having a cross-section profile generated by imaging the cross-section profile of the first claw of the conjugate rotor and then rotating around the center of the defined rotor to be located in place such that the cross-section profile of the second claw consisting of an epicycloid, a fourth curve, a third curve, a second curve, and a first curve all connected together in sequence in a counterclockwise direction. The defined rotor further comprises multiple claws formed in pairs by imaging the cross-section profiles of the first and second claws together then rotating around the center of the defined rotor to be located in place.

According to the embodiment, the conjugate rotor comprises a second claw having a cross-section profile generated by imaging the cross-section profile of the first claw of the defined rotor and then rotating around the center of the conjugate rotor to be located in place such that the cross-section profile of the second claw consisting of a fourth arc, a third arc, a second arc, a first arc, and an epicycloids all connected together in sequence in a clockwise direction. The conjugate rotor further comprises multiple claws formed in pairs by imaging the cross-section profiles of the first and second claws then rotating around the center of the conjugate rotor.

According to another embodiment of the present invention, a first claw of the defined rotor comprises has a cross-section profile consisting of an epicycloid, a second arc, and a third arc all connected together in sequence in a counterclockwise direction from the epicycloid to the second and third fourth arcs. A first claw of the conjugate rotor has a cross-section profile consisting of a second curve, a third curve, and an epicycloid all connected together in sequence in a clockwise direction from the second and third curves to the epicycloid, wherein the second and third curves are defined as a conjugate curve corresponding to the second and third arcs of the defined rotor, and jointly form an angle of 360° divided by number of claws with respect to the center of the conjugate rotor. Further multiple claws of the defined and conjugate rotors are formed by the same method as described in the above paragraphs.

DESCRIPTION OF THE PREFERRED EMBODIMENTS

Figure 1:
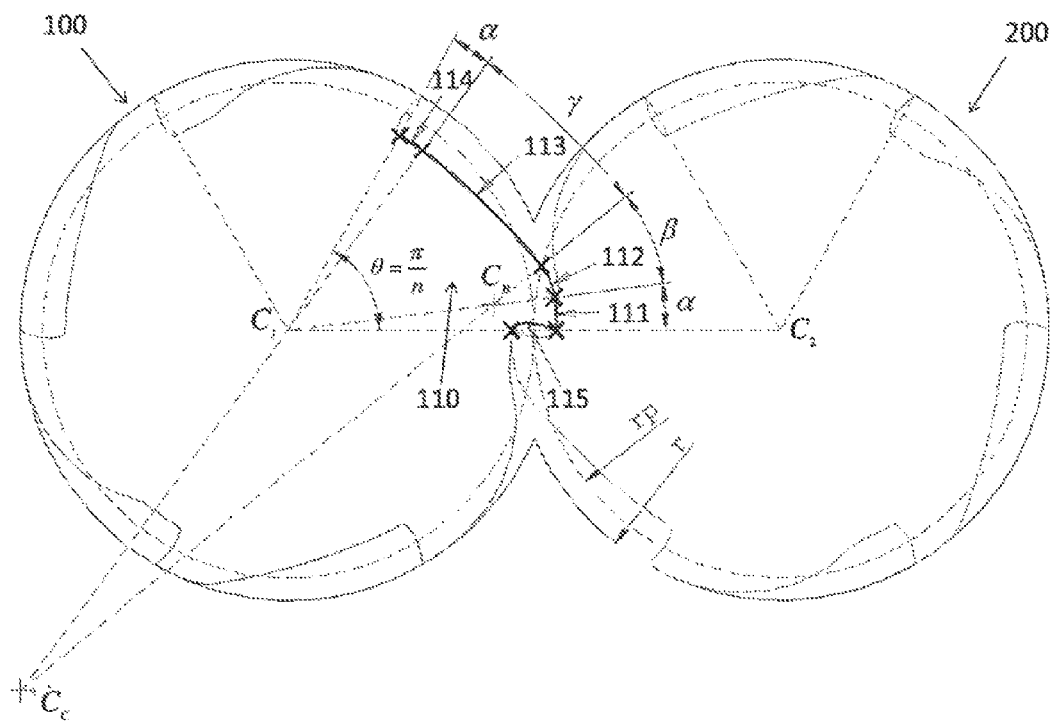
FIGS. 1 to 4 are cross-sectional views of a first embodiment of a device of a pair of claw-type rotors having same profiles of the present invention.
Figure 2:
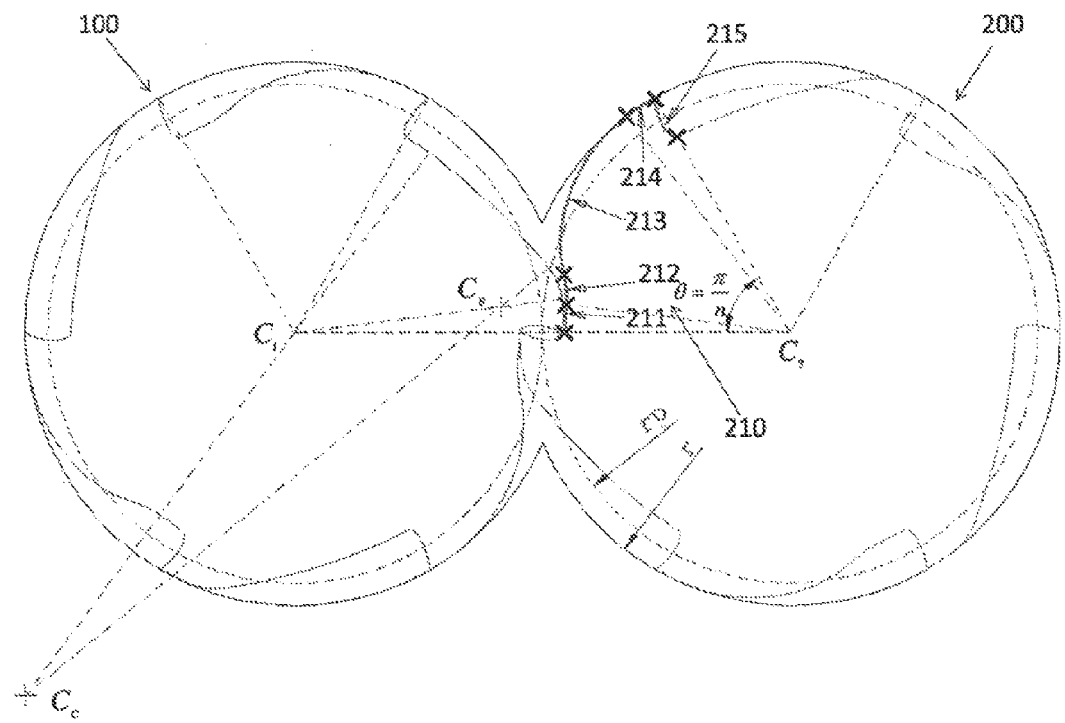

Referring to FIGS. 1 to 4 showing a first embodiment of a device of a pair of claw-type rotors of the present invention, the pair of claw-type rotors have same profiles and comprise a defined rotor 100 and a conjugate rotor 200 both intermeshing with and conjugating to each other. Referring to FIG. 1, in this embodiment the defined rotor 100 and the conjugate rotor 200 each has six claws, and profiles of the claws of the defined and conjugate rotors 100 and 200 are same as each other. A first claw of the defined rotor 100 has a cross-section profile including a sharp portion and a root portion that are defined by predetermined non-linear equations. A cross-section profile of a first claw 210 of the conjugate rotor 200 is defined by the conjugate theory (as shown in FIG. 2). The first claw 210 of the conjugate rotor 200 is imaged to the defined rotor 100 to form a second claw of the defined rotor 100, while the cross-section profile of the first claw 110 of the defined rotor 100 is imaged to the conjugate rotor 200 to form a second claw of the conjugate rotor 200. In this manner, each of the defined rotor 100 and the conjugate rotor 200 can further have multiple claws formed in pairs by imaging both the first and second claws then rotating to be located in place.

Referring to FIGS. 1 and 2, the defined rotor 100 and the conjugate rotor 200 each has a same even number of claws with same cross-section profiles. In this embodiment the number of claws is six. Specifically, the defined rotor 100 and the conjugate rotor 200 each has a same rotor radius r and a same pitch circle radius $r_p$, the rotor radius r is larger than the pitch circle radius $r_p$. The cross-section profile of the first claw 110 of the defined rotor 100 consists of an epicycloid 115, a first arc 111, a second arc 112, a third arc 113, and a fourth arc 114 all connected together in sequence in a counterclockwise direction from the epicycloid 115 to the first, second, third, and fourth arcs 111, 112, 113 and 114, wherein the first, second, third, and fourth arcs 111, 112, 113 and 114 jointly form an angle of 360° divided by the number of claws with respect to a center $C_1$ of the defined rotor 100. The first arc 111 and the fourth arc 114 each has a center being designated as same as the center $C_1$ of the defined rotor 100, and each of the first and fourth arcs 111 and 114 has a same arc angle α. The first arc 111 has a radius same as the rotor radius r of the defined rotor 100. The fourth arc 114 has a radius which is the rotor radius r subtracted from two times the pitch circle radius $r_p$. In particular, the first, second, third, and fourth arcs 111, 112, 113 and 114 have slope continuity at points where the first, second, third, and fourth arcs 111, 112, 113 and 114 connect with each other, whereby locations of centers $C_B$ and $C_C$, values of radiuses $r_B$ and $r_C$, and arc angles β and γ of the second and third arcs 112 and 113 are capable of being defined in accordance with the slope continuity and geometric relations between the first and fourth arcs 111 and 114. The radius $r_B$ of the second arc 112 is defined by a first equation as follows:

$$r_B = r - \frac{\sin\gamma}{\sin\left(\frac{\pi}{n} - (2\alpha + \gamma)\right)} b,$$

wherein γ represents the corresponding arc angle of the third arc 113, b represents a value ($b = r_c - (2r_p - r)$) that the rotor radius r of the defined rotor 110 is subtracted from two times the pitch circle radius $r_p$ and is further subtracted from the radius $r_c$ of the third arc 113, wherein a corresponding value of γ and unknown parameters are defined by a second equation as follows:

$$f_5(\gamma) = b\left(\sin\left(\frac{\pi}{n} - 2\alpha\right) - \sin\gamma\right) - (r_c - r)\sin\left(\frac{\pi}{n} - (2\alpha + \gamma)\right) = 0$$

The value of γ can be defined by utilizing the law of sines, differentials of functions, and solving the non-linear equations. Furthermore, the arc angles α of the first and fourth arcs 111 and 114 are respectively bigger than zero.

Referring to FIG. 2, the cross-section profile of the first claw 210 of the conjugate rotor 200 consisting of a first curve 211, a second curve 212, a third curve 213, a fourth curve 214, and an epicycloid 215 all connected together in sequence in a clockwise direction from the first, second, third, and fourth curves 211, 212, 213 and 214 to the epicycloids 215. The first, second, third, and fourth curves 211, 212, 213 and 214 are defined as a conjugate curve corresponding to the first, second, third, and fourth arcs 111, 112, 113 and 114 of the defined rotor 100, and jointly form an angle of 360° divided by the number of claws with respect to a center $C_2$ of the conjugate rotor 200. The epicycloid 215 is formed by imaging the epicycloid 115 of the first claw 110 of the defined rotor 100 and rotating around the center $C_2$ of the conjugate rotor 200 to be located in place.

Figure 3:
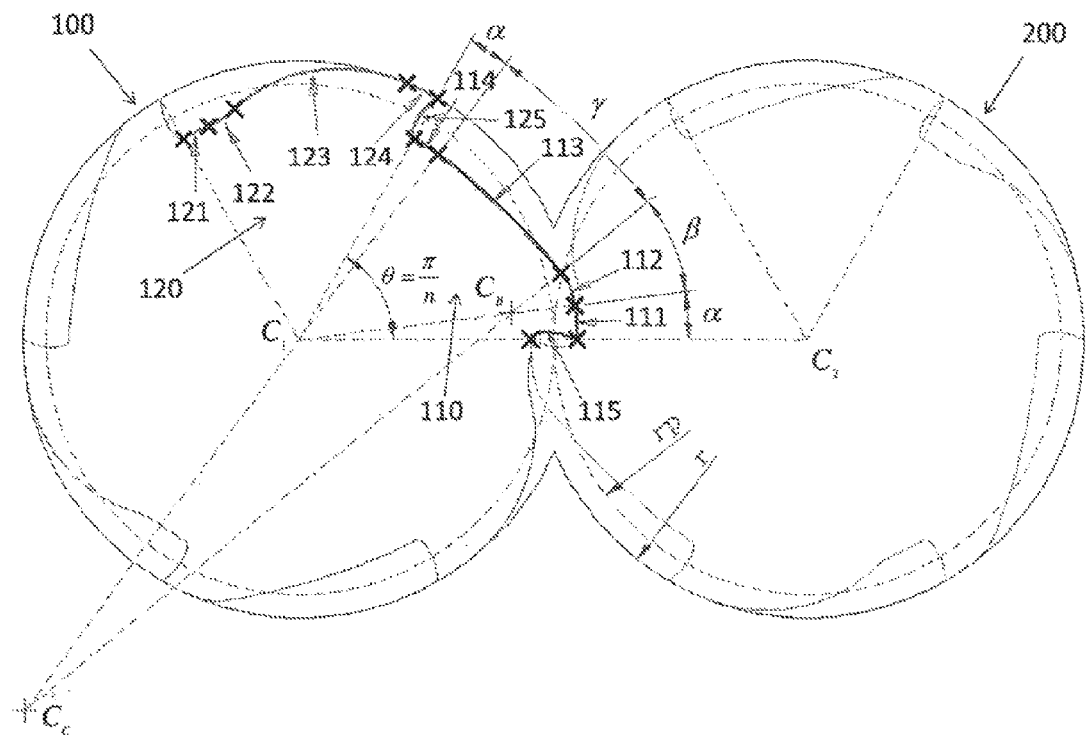

Referring to FIG. 3, the defined rotor 100 comprises a second claw 120 having a cross-section profile generated by imaging the cross-section profile of the first claw 210 of the conjugate rotor 200 (shown in FIG. 2) and then rotating around the center $C_1$ of the defined rotor 100 to be located in place such that the cross-section profile of the second claw 120 consists of an epicycloids 125, a fourth curve 124, a third curve 123, a second curve 122, and a first curve 121 all connected together in sequence in a counterclockwise direction. Furthermore, the defined rotor 100 may further comprise multiple claws (such as, for example, third, fourth, fifth, sixth claws, etc.) formed in pairs by imaging the cross-section profiles of the first and second claws 110 and 120 together then rotating around the center $C_1$ of the defined rotor 100 to be located in place. In other words, the third and fourth claws are formed to be one pair, and the fifth and sixth claws are formed to be another pair.

Figure 4:
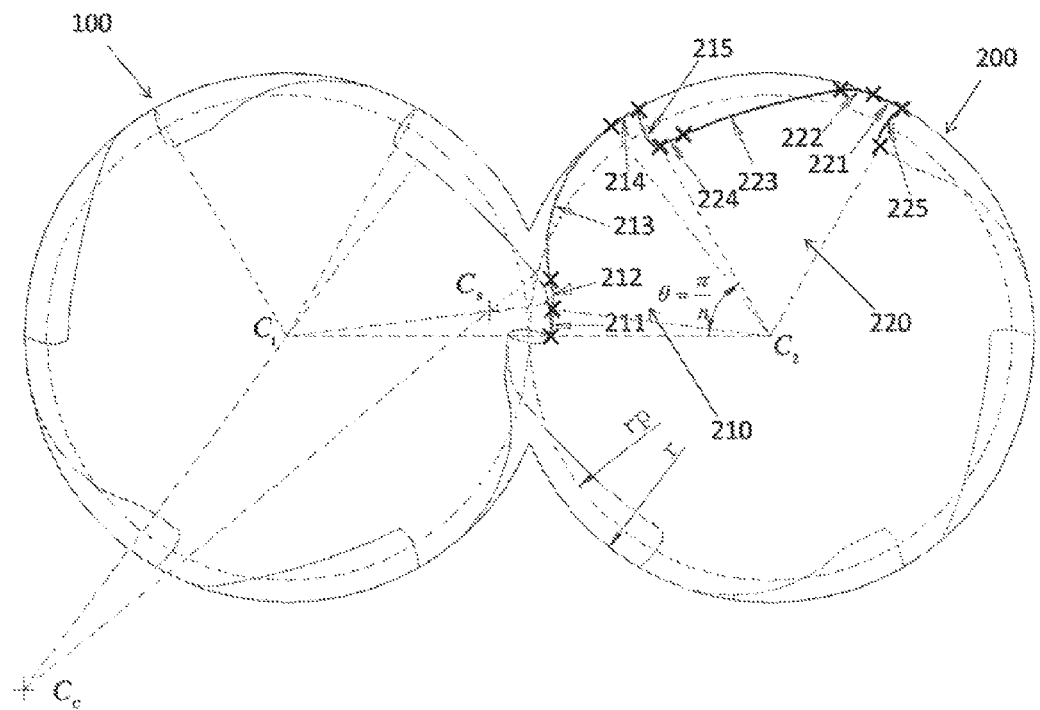

Referring to FIG. 4, the conjugate rotor 200 comprises a second claw 220 having a cross-section profile generated by imaging the cross-section profile of the first claw 110 of the defined rotor 100 and then rotating around the center $C_2$ of the conjugate rotor 200 to be located in place such that the cross-section profile of the second claw 220 of the conjugate rotor 200 consists of a fourth arc 224, a third arc 223, a second arc 222, a first arc 221, and an epicycloids 215 all connected together in sequence in a clockwise direction. Likewise, as same as the defined rotor 100, the conjugate rotor 200 may further comprise multiple claws formed in pairs by imaging the cross-section profiles of the first and second claws 210 and 220 together then rotating around the center $C_2$ of the conjugate rotor 200 to be located in place.

Figure 5:
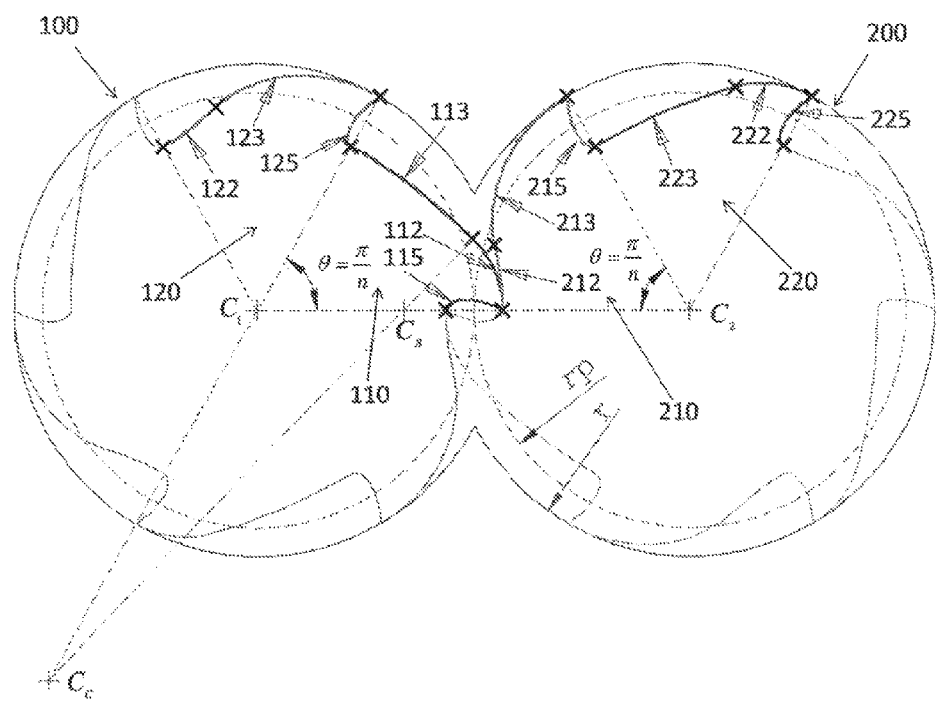
FIG. 5 is a cross-section view of a second embodiment of the present invention.

Referring to FIG. 5 showing a second embodiment of the present invention, the defined rotor 100 and the conjugate rotor 200 each also has six claws, and the claws of the defined and conjugate rotors 100 and 200 have same profiles. A noticeable difference between the first and second embodiments is that in the second embodiment the defined rotor 100 comprises a first claw 110 having a cross-section profile consisting of an epicycloid 115, a second arc 112, and a third arc 113 connected together in sequence in a counterclockwise direction from the epicycloid 115 to the second and third fourth arcs 112 and 113. It is noted that the arc angle of α for the first and second equations is designated as zero degree. A first claw 210 of the conjugate rotor 200 has a cross-section profile consisting of a second curve 212, a third curve 213, and an epicycloid 215 connected together in sequence in a clockwise direction from the second and third curves 212 and 213 to the epicycloid 215.

In the second embodiment the second and third arcs 112 and 113 jointly form an angle of 360° divided by the number of claws with respect to a center $C_1$ of the defined rotor 100. The epicycloid 115 is defined by a start point and an end point, the start point spaced away from the center $C_1$ of the defined rotor 100 at a distance which is the rotor radius r subtracted from two times the pitch circle radius $r_p$, while the end point is spaced apart from the center $C_1$ of the defined rotor 100 with the rotor radius r, and the start point and end point of the epicycloid 115 are in alignment with the center $C_1$. The second arc 112 starts from the end point of the epicycloid 115 and has a center $C_B$ located at a point between and in alignment with both the centers $C_1$ and $C_2$ of the defined rotor 100 and conjugate rotor 200. The third arc 113 ends at a distance of the rotor radius r subtracted from two times the pitch circle radius $r_p$ and is located at a point where an angle of the defined rotor 100 with respect to a vertical axis is equal to 360° divided by number of claws.

Likewise, other structures of the defined and conjugate rotors 100 and 200 not mentioned in the second embodiment are formed by the same method as described above in the first embodiment.

Figure 6:
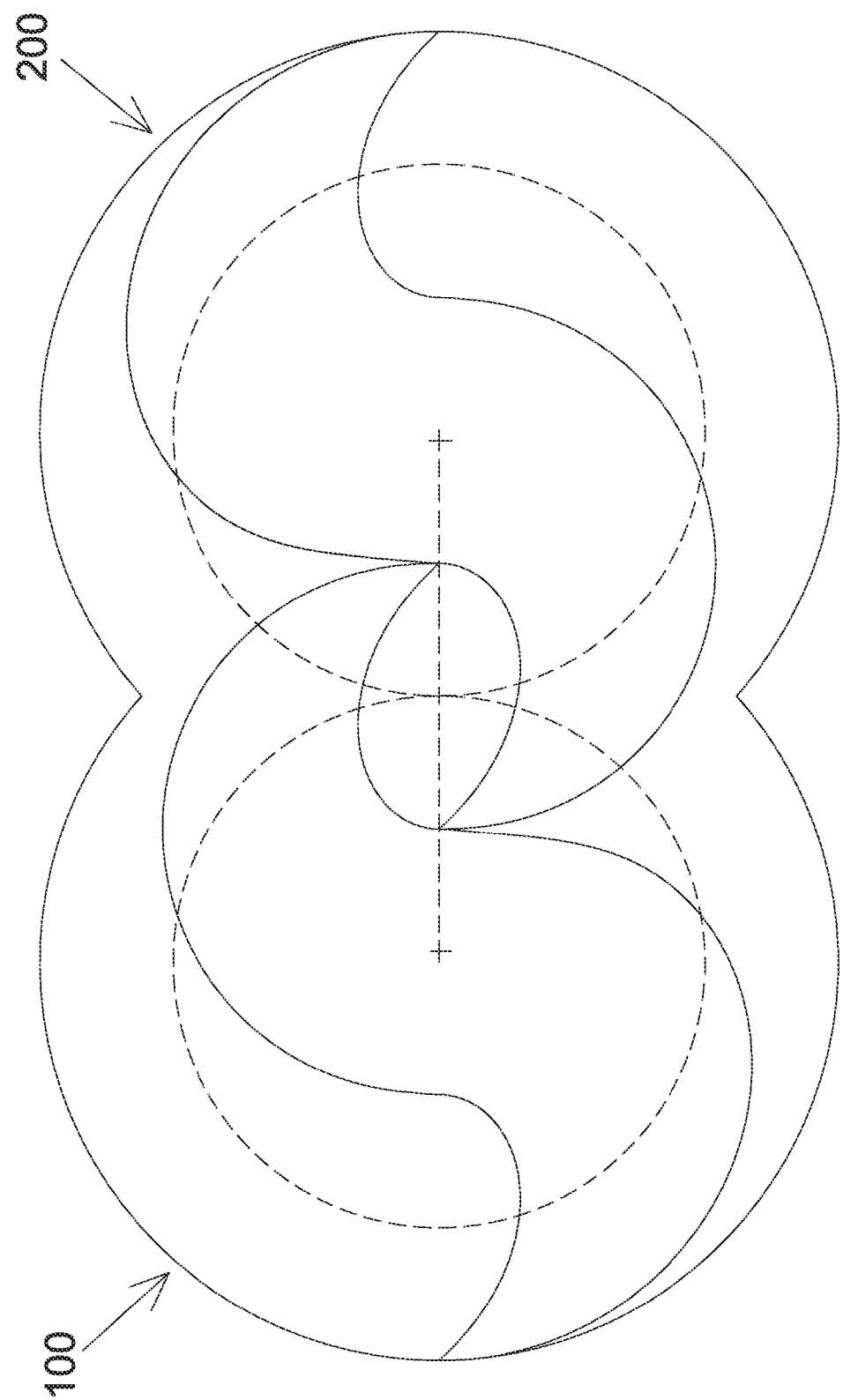
FIGS. 6 to 8 are schematic views respectively showing a pair of claw-type rotors each having two claws, four claws, and eight claws generated by setting different parameters in accordance with the present invention.
Figure 7:
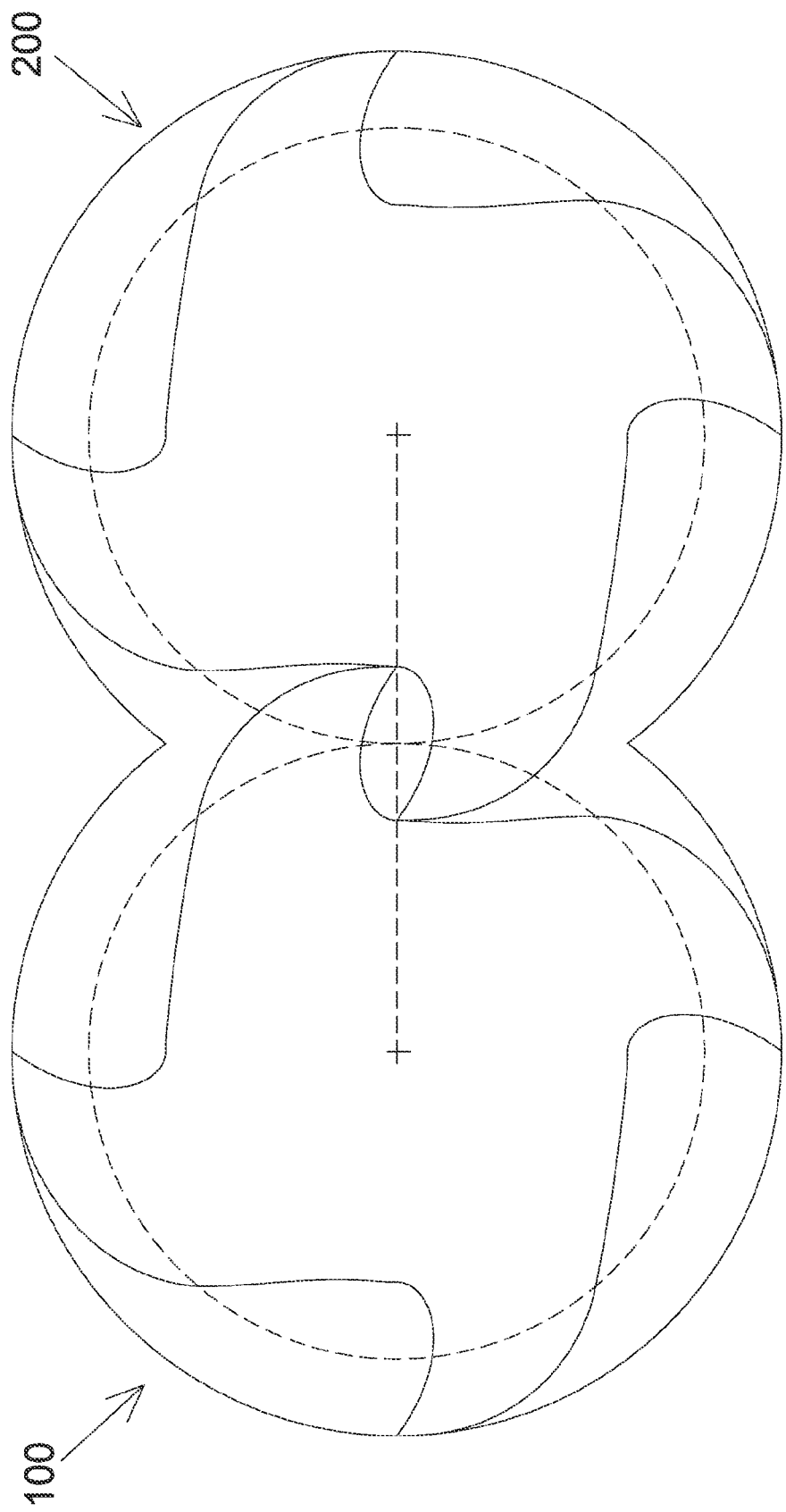
Figure 8:
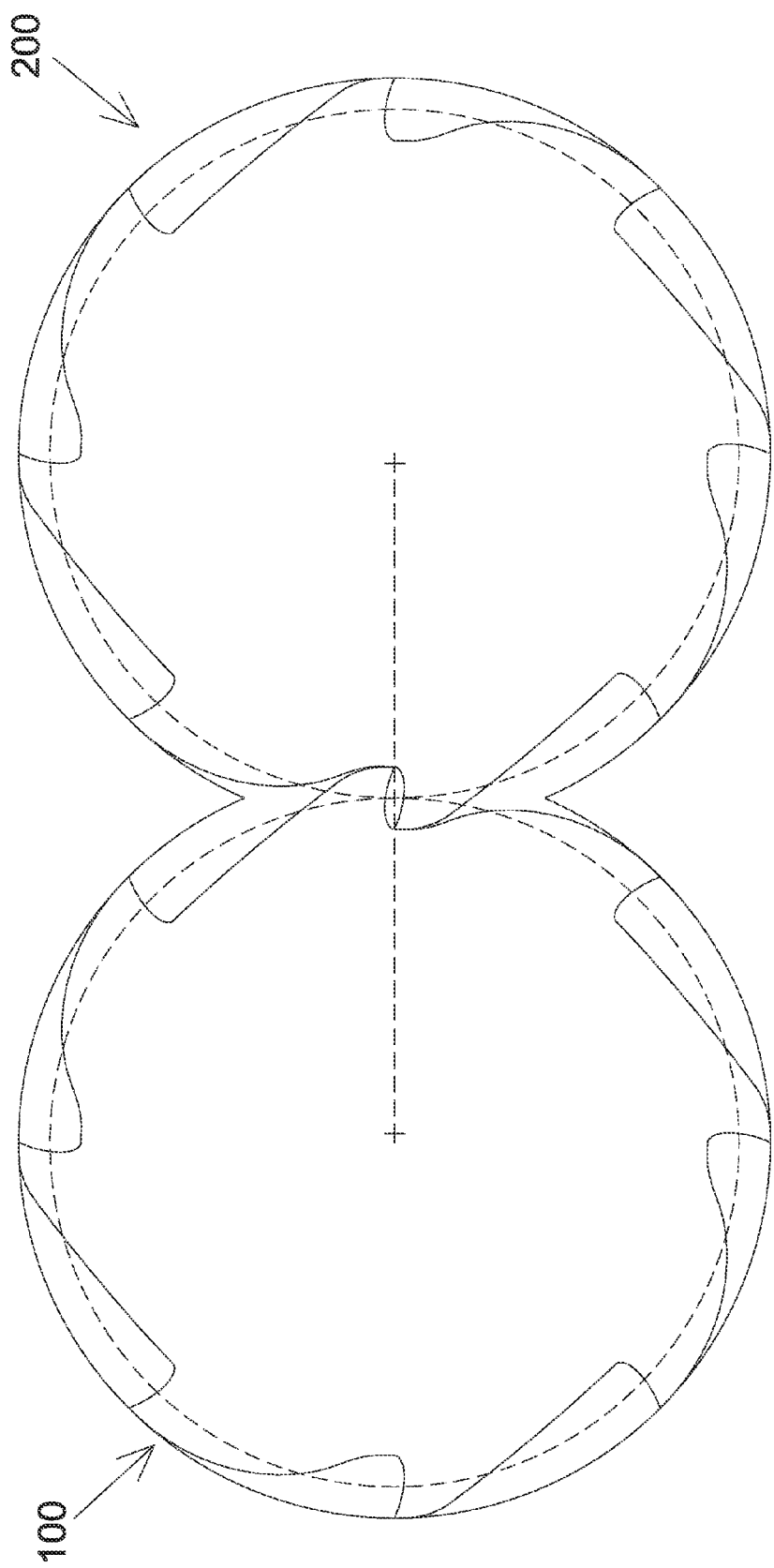

Further referring to FIGS. 6 to 8, under the conditions as described in the above-mentioned embodiments, the number of claws of the defined and conjugate rotors 100 and 200 are varied according to practical applications by setting different parameters, which are number of claws 2n, a pitch circle radius $r_p$, a radius r of the defined rotor 100, the radiuses and arc angles of each of the arcs are varied according to different parameters, whereby the defined and conjugate rotors can be formed with two claws, four claws, eight claws or other configurations of an even number of claws. As shown in FIG. 6, parameters given in the rotors having two claws are as follows: number of claws 2n=2, pitch circle radius $r_p$=40, radius r of the defined rotor 100 (r=60), radius $r_c$ of the third arc 113 ($r_c$=300), an arc angle α of the first arc 111 (α=5°), an arc angle α of the fourth arc 114 (α=5°). Referring to FIG. 7 showing four-claw rotors, parameters given are as follows: number of claws 2n=4, pitch circle radius $r_p$=48, radius r of the defined rotor 100 (r=60), radius $r_c$ of the third arc 113 ($r_c$=300), an arc angle α of the first arc 111 (α=5°), an arc angle α of the fourth arc 114 (α=5°). Referring to FIG. 8 showing eight-claw rotors, parameters given are as follows: number of claws 2n=8, pitch circle radius $r_p$=55, radius r of the defined rotor 100 (r=60), radius $r_c$ of the third arc 113 ($r_c$=300), an arc angle α of the first arc 111 (α=2°), an arc angle α of the fourth arc 114 (α=2°).

Accordingly, the present invention is utilized to provide the defined rotor 100 and the conjugate rotor 200 intermesh with and conjugate to each other and have same even number of claws of same profiles by setting parameters. In particular, each claw having the root portion and sharp portion (i.e. the cross-section profile of the claw) rotates in a continuously and smoothly motion curve so as to avoid noise and vibration occurring during the compressing motion in periodic cycles and to mitigate mechanical fatigue resulting from intermeshing of the defined and conjugate rotors, whereby the lifespan of the device of the claw-type rotors is extended.

It is understood that the invention may be embodied in other forms within the scope of the claims. Thus the present examples and embodiments are to be considered in all respects as illustrative, and not restrictive, of the invention defined by the claims.

What is claimed is:

1. A device of a pair of claw rotors having same profiles, comprising a defined rotor and a conjugate rotor both intermeshing with and conjugating to each other;

wherein the defined rotor and the conjugate rotor each has a same rotor radius and a same pitch circle radius, the rotor radius being larger than the pitch circle radius, the defined rotor and the conjugate rotor each comprising a same even number of claws with same cross-section profiles;

wherein the defined rotor comprises a first claw having a cross-section profile consisting of an epicycloid, a first arc, a second arc, a third arc, and a fourth arc all connected together in sequence in a counterclockwise direction from the epicycloid to the first, second, third, and fourth arcs, wherein the first, second, third, and fourth arcs jointly form an angle of 360° divided by number of claws with respect to a center of the defined rotor, the first arc and the fourth arc each having a center being designated as same as the center of the defined rotor, and each of the first and fourth arcs having a same arc angle, the first arc having a radius same as the rotor radius of the defined rotor, the fourth arc having a radius which is the rotor radius subtracted from two times the pitch circle radius, wherein the first, second, third, and fourth arcs have slope continuity at points where the first, second, third, and fourth arcs connect with each other, whereby locations of centers, values of radiuses, and arc angles of the second and third arcs are capable of being defined in accordance with the slope continuity and geometric relations between the first and fourth arcs;

wherein the conjugate rotor comprises a first claw having a cross-section profile consisting of a first curve, a second curve, a third curve, a fourth curve, and an epicycloid all connected together in sequence in a clockwise direction from the first, second, third, and fourth curves to the epicycloid, wherein the first, second, third, and fourth curves are defined as a conjugate curve corresponding to the first, second, third, and fourth arcs of the defined rotor, and jointly form an angle of 360° divided by number of claws with respect to a center of the conjugate rotor, the epicycloid of the conjugate rotor being formed by imaging the epicycloid of the first claw of the defined rotor and rotating around a center of the conjugate rotor to be located in place;

the defined rotor comprising a second claw having a cross-section profile generated by imaging the cross-section profile of the first claw of the conjugate rotor and then rotating around the center of the defined rotor to be located in place such that the cross-section profile of the second claw consists of an epicycloid, a fourth curve, a third curve, a second curve, and a first curve all connected together in sequence in a counterclockwise direction;

the conjugate rotor comprising a second claw having a cross-section profile generated by imaging the cross-section profile of the first claw of the defined rotor and then rotating around the center of the conjugate rotor to be located in place such that the cross-section profile of the second claw consists of a fourth arc, a third arc, a second arc, a first arc, and an epicycloid all connected together in sequence in a clockwise direction;

the defined rotor further comprising multiple claws formed in pairs by imaging the cross-section profiles of the first and second claws together then rotating around the center of the defined rotor to be located in place; and the conjugate rotor further comprising multiple claws formed in pairs by imaging the cross-section profiles of the first and second claws then rotating around the center of the conjugate rotor.

2. The device of claim 1, wherein a corresponding arc angle of the third arc is defined by predetermined non-linear equations.

3. The device of claim 2, wherein the radius of the second arc is obtained by making an inference from the non-linear equations.

4. The device of claim 3, wherein the arc angle of the third arc is defined by utilizing the law of sines, differentials of functions, and solving the non-linear equations.

5. The device of claim 2, wherein the arc angles of the first and fourth arcs are respectively bigger than zero.

6. A device of a pair of claw rotors having same profiles, comprising a defined rotor and a conjugate rotor both intermeshing with and conjugating to each other;

wherein the defined rotor and the conjugate rotor each has a same rotor radius and a same pitch circle radius, the rotor radius being larger than the pitch circle radius, the defined rotor and the conjugate rotor each comprising a same even number of claws with same cross-section profiles;

wherein the defined rotor comprises a first claw having a cross-section profile consisting of an epicycloid, a second arc, and a third arc all connected together in sequence in a counterclockwise direction from the epicycloid to the second and third fourth arcs, wherein the second and third arcs jointly form an angle of 360° divided by number of claws with respect to a center of the defined rotor, the epicycloid defined by a start point and an end point, the start point spaced away from the center of the defined rotor at a distance of the rotor radius subtracted from two times the pitch circle radius, while the end point is spaced apart from the center of the defined rotor with the rotor radius, the second arc starting from the end point of the epicycloid and having a center located at a point between and in alignment with both the centers of the defined rotor and conjugate rotor, the third arc ending at a point spaced apart from the center of the defined rotor at a distance that is the rotor radius subtracted from two times the pitch circle radius, and forming an angle with respect to the center of the defined rotor and a horizontal line that is equal to 360° divided by number of claws, wherein the second and third arcs have slope continuity at where the second and third arcs connect, whereby locations of centers, values of radiuses, and arc angles of the second and third arcs are capable of being defined in accordance with the slope continuity and geometric relations between the second and third arcs;

the conjugate rotor comprises a first claw having a cross-section profile consisting of a second curve, a third curve, and an epicycloid all connected together in sequence in a clockwise direction from the second and third curves to the epicycloid, wherein the second and third curves are defined as a conjugate curve corresponding to the second and third arcs of the defined rotor, and jointly form an angle of 360° divided by number of claws with respect to the center of the conjugate rotor, the epicycloid of the conjugate rotor being formed by imaging the epicycloid of the first claw of the defined rotor and then rotating around a center of the conjugate rotor to be located in place;

the defined rotor comprising a second claw having a cross-section profile generated by imaging the cross-section profile of the first claw of the conjugate rotor and then rotating around the center of the defined rotor to be located in place such that the cross-section profile of the second claw consisting of an epicycloid, a third curve and a second curve all connected together in sequence in a counterclockwise direction;

the conjugate rotor comprising a second claw having a cross-section profile generated by imaging the cross-section profile of the first claw of the defined rotor and then rotating around the center of the conjugate rotor to be located in place such that the cross-section profile of the conjugate rotor consisting of a third arc, a second arc, and an epicycloid all connected together in sequence in a clockwise direction;

the defined rotor further comprising multiple claws formed in pairs by imaging the cross-section profiles of the first and second claws then rotating around the center of the defined rotor to be located in place; and the conjugate rotor further comprising multiple claws formed in pairs by imaging the cross-section profiles of the first and second claws then rotating around the center of the conjugate rotor to be located in place.

7. The device of claim 6, wherein a corresponding arc angle of the third arc is defined by predetermined non-linear equations.

8. The device of claim 7, wherein the radius of the second arc is obtained by making an inference from the non-linear equations.

9. The device of claim 8, wherein the arc angle of the third arc is defined by utilizing the law of sines, differentials of functions and solving the non-linear equations.

* * * * *